United States Patent
Acton et al.

(10) Patent No.: US 10,241,192 B1
(45) Date of Patent: Mar. 26, 2019

(54) OBJECT TRACKING USING RECEIVERS

(71) Applicant: ARIN Technologies, Inc., Pittsburgh, PA (US)

(72) Inventors: Aaron Acton, Pittsburgh, PA (US); Harish Balakrishnan, Pittsburgh, PA (US); Pradyumna P. Kulkarni, McMurray, PA (US); Perry J. Servedio, Sacremento, CA (US); Mark Imgrund, Canonsburg, PA (US)

(73) Assignee: ARIN Technologies, Inc., Pittsburgh, PA (US)

( * ) Notice: Subject to any disclaimer, the term of this patent is extended or adjusted under 35 U.S.C. 154(b) by 0 days.

(21) Appl. No.: 15/952,878

(22) Filed: Apr. 13, 2018

(51) Int. Cl.
*G01S 5/06* (2006.01)
*G01S 5/00* (2006.01)
*G01S 5/02* (2010.01)

(52) U.S. Cl.
CPC .............. *G01S 5/06* (2013.01); *G01S 5/0081* (2013.01); *G01S 5/0221* (2013.01); *G01S 5/0284* (2013.01)

(58) Field of Classification Search
CPC ................................................ G01S 5/00–5/30
See application file for complete search history.

(56) References Cited

U.S. PATENT DOCUMENTS

| | | | | |
|---|---|---|---|---|
| 7,710,322 B1* | 5/2010 | Ameti | ....................... | G01S 5/10 342/465 |
| 2016/0377697 A1* | 12/2016 | Sella | ..................... | G01S 5/0289 342/451 |
| 2017/0064667 A1* | 3/2017 | Mycek | ................. | H04B 17/318 |

* cited by examiner

*Primary Examiner* — Raymond S Dean
(74) *Attorney, Agent, or Firm* — Ference & Associates LLC

(57) ABSTRACT

One embodiment provides a method, including: receiving, from at least one transmitter coupled to an object, a transmission signal, wherein the transmission signal is received at a subset of a plurality of receivers, wherein the plurality of receivers are connected together through a network and have a synchronized clock; identifying, for each of the subset of the plurality of receivers, a time of receipt of the transmission signal and marking the transmission signal with a timestamp corresponding to the time of receipt; determining, using the marked transmission signals, a relative position of the object relative to the receivers; and identifying a location of the object within an environment by correlating the determined relative position of the object to a map of the environment. Other aspects are described and claimed.

20 Claims, 7 Drawing Sheets

OBJECT TRACKING USING RECEIVERS

BACKGROUND

Many entities track objects within an environment, for example, a manufacturing facility, storage facility, or the like. Tracking the object assists in determining the location of the object in real time or at a later point in time. Additionally, tracking an object as it moves through a facility allows an entity to determine wherein the object is, where the object has been, and, therefore, what steps or processes have been performed on the object. For example, a manufacturing company may track an object and mark different steps as being complete when the object has been presented at a particular location and the process associated with that location has been performed. The entity can then look up the tracking record associated with that object to determine which steps have been performed, when the steps were performed, who performed the steps, what steps need to be performed, and the like. Thus, tracking objects is very useful to many different entities.

BRIEF SUMMARY

In summary, one aspect provides a method comprising: receiving, from at least one transmitter coupled to an object, a transmission signal, wherein the transmission signal is received at a subset of a plurality of receivers, wherein the plurality of receivers are connected together through a network and have a synchronized clock; identifying, for each of the subset of the plurality of receivers, a time of receipt of the transmission signal and marking the transmission signal with a timestamp corresponding to the time of receipt; determining, using the marked transmission signals, a relative position of the object relative to the receivers; and identifying a location of the object within an environment by correlating the determined relative position of the object to a map of the environment.

Another aspect provides a system, comprising: a plurality of receivers connected together through a network and having a synchronized clock; a processor; a memory device that stores instructions executable by the processor to: receive, from at least one transmitter coupled to an object, a transmission signal, wherein the transmission signal is received at a subset of the plurality of receivers; identify, for each of the subset of the plurality of receivers, a time of receipt of the transmission signal and marking the transmission signal with a timestamp corresponding to the time of receipt; determine, using the marked transmission signals, a relative position of the object relative to the receivers; and identify a location of the object within an environment by correlating the determined relative position of the object to a map of the environment.

A further aspect provides a product, comprising: a storage device that stores code, the code being executable by a processor and comprising: code that receives, from at least one transmitter coupled to an object, a transmission signal, wherein the transmission signal is received at a subset of a plurality of receivers, wherein the plurality of receivers are connected together through a network and have a synchronized clock; code that identifies, for each of the subset of the plurality of receivers, a time of receipt of the transmission signal and marking the transmission signal with a timestamp corresponding to the time of receipt; code that determines, using the marked transmission signals, a relative position of the object relative to the receivers; and code that identifies a location of the object within an environment by correlating the determined relative position of the object to a map of the environment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
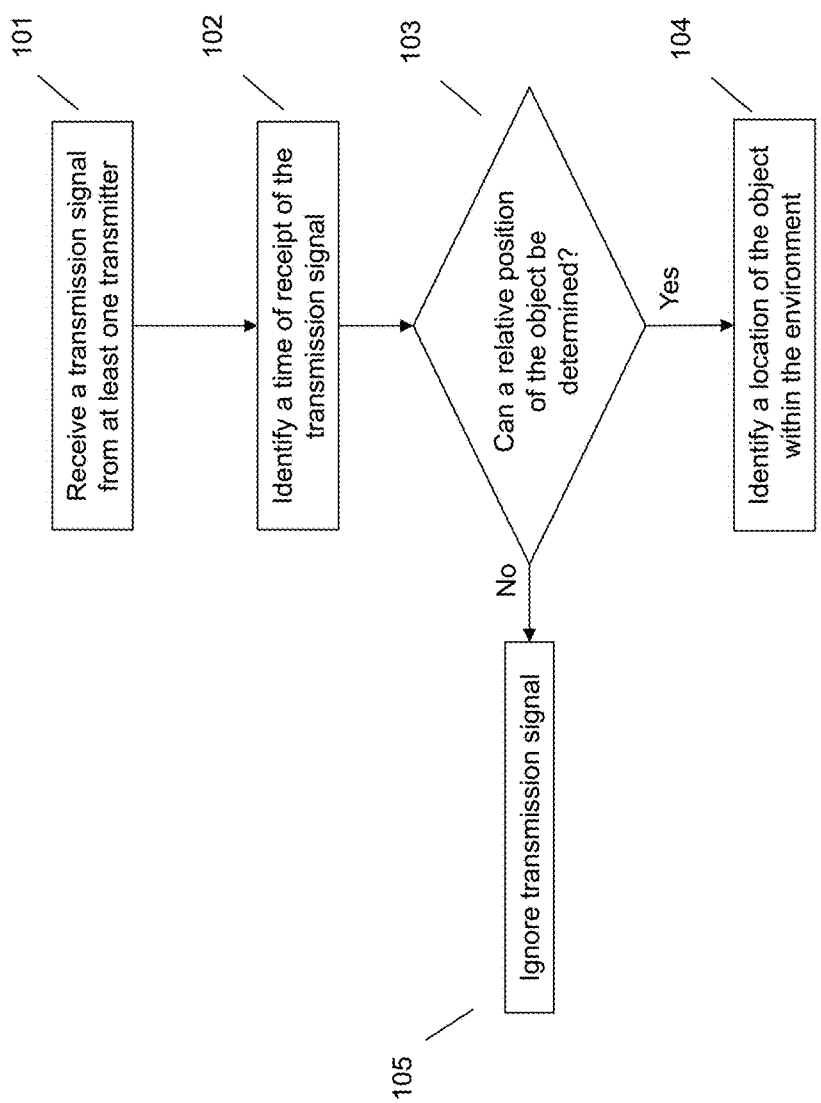
FIG. 1 illustrates a method for object tracking using a location engine and mesh network.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Knowing the location of an object within an environment may be very useful. For example, knowing the location of an object as it moves through an environment can be helpful when determining if the object has completed a particular step or if the object has been at a particular location. As an example, as an object moves through an assembly line, it is helpful to know which steps have been performed on the object. As another example, if an object is located in a storage location, it is helpful to know the exact location of the object within the storage location when attempting to find the object at a later time. Additionally, by tracking the object and information associated with the steps performed on the object, entities can identify different characteristics of the object. For example, if an entity determines that a particular machine that performs a particular step has malfunctioned and likely incorrectly performed the step on multiple objects, the entity can search the object records to determine which objects are likely to be affected by the machine malfunction so that those objects can be reworked or verified.

Traditional object locators and trackers have included pen and paper techniques where, when the object is at a particular location, a person records information regarding the interaction with the object at the location, for example, the date and time, process performed on the object, person performing the process, and the like. This technique can lead to inaccurate records due to human error. Additionally, this technique is very time consuming and requires extra steps to be performed by multiple users. Finally, this technique requires that a paper record be attached to or located with an object as it moves through a process, which can lead to problems if the paper record is lost or misplaced during the object's traversal through the process. A similar technique requires that a user manually enter tracking and processing information into a database or other tracking software. While this may eliminate or at least minimize the possibility of losing the record, the other disadvantages of a user manually entering information remain using this technique.

Another conventional object tracking technique relies on electronic transmitters (e.g., radio frequency identification (RFID) tags, BLUETOOTH® tags, etc.) and corresponding receivers. A transmitter is affixed to the object and when the object comes within proximity of the receiver, the transmitter sends a signal having a transmitter identification to the receiver. The receiver can then identify that the object, or at least the transmitter of the object, was within proximity to the receiver. However, this technique has a very coarse resolution, for example, many feet or meters or even longer distances. In other words, the accuracy regarding the location of the object within a particular environment is only accurate to within many feet or meters, or even longer distances. BLUETOOTH is a registered trademark of Bluetooth Sig, Inc. in the United States and other countries.

The coarse resolution may be acceptable if the receiver is a gateway receiver, meaning that the receiver is associated with a particular entry point into or out of a location. In this case, the object cannot pass from one place to another place without being captured by the receiver because there is no way around the receiver. However, such a coarse accuracy is not helpful in determining the exact location of an object in an environment, particularly if the object could be associated with many different locations within proximity of the receiver. For example, if an object is moving through an assembly line where the different step locations are located within only a few feet of each other, the traditional technique will be unable to differentiate at which step the object is currently located.

Another problem with this technique is that the signals may encounter interferences causing distortions of the signal which may result in the signal not reaching the receiver. For example, signals may be susceptible to being reflected off surfaces which may result in the signal never reaching the receiver. As another example, some communication signals are not very strong and therefore cannot be transmitted through objects. Therefore, if an object is located within the signal transmission path, the signal may never reach the receiver. Thus, in conventional systems that do not have multiple receivers covering a single location, the object that is intended to be tracked may have missing tracking points because the signal is never received by a receiver.

Accordingly, an embodiment provides a method for determining the location of an object within an environment using a plurality of receivers. A tracking system may receive a transmission signal from at least one transmitter that is coupled to and associated with an object. The transmission signal may be received by a subset of receivers of the tracking system, for example, at least three receivers for a two-dimensional object location or at least four receivers for a three-dimensional object location. The subset of receivers may be a few receivers of a plurality of receivers that are connected together in a network and that have synchronized clocks. The plurality of receivers may be employed in an environment, for example, manufacturing facility, storage facility, shipping facility, assembly facility, or the like.

Upon receipt of the transmission signal, each of the receivers that received the signal mark the transmission signal with a timestamp corresponding to the time of receipt of the signal at the receiver. Using this information the system can determine the relative position of the object with respect to the receiving receivers. For example, using a time difference of arrival (TDOA) algorithm, the system can determine an area that corresponds to positions that the transmitter could be located from the receiver. By determining this area for each of the receivers, the system can identify the area of overlap that identifies the position of the object with respect to the receivers. By correlating this relative position to a map of the environment, the system can then determine the location of the object within the environment. The system may then provide a graphical user interface that displays the location of the object within the environment. Additionally or alternatively, the system may use the location information to take actions based upon predefined rules (e.g., send an alert, trigger an event, etc.), updating information in a database, or the like.

Such a system provides a technical improvement to current object tracking systems. The described systems and methods do not require access to a positioning system that requires signals to be transmitted out of a building, for example, global positioning system (GPS), thereby providing a technique that can track objects within locations where traditional positioning systems are unavailable. The described systems and methods provide a technique that does not require user input to manually enter information regarding the location and process steps of an object. Rather, the plurality of receivers can capture transmission signals and determine the location of the object within the environment with respect to the multiple receivers. Additionally, because multiple receivers capture the transmission signal, the location of the object within the environment can be determined to a relatively precise location, for example, within a couple of inches, thereby allowing for a differentiation of a location of an object to within that accuracy. Using an ultra-wide band frequency radio allows for a greater communication bandwidth, and, accordingly, a greater accuracy with respect to a position of the transmitter within an environment. This allows for the system to determine if an object is at one location or another location, even if the locations are located in very close proximity to one another. Additionally, since multiple receivers are placed within an area, the signal interference caused by other objects within the environment can be minimized and still allow the location of the object within the environment to be determined. Thus, the systems and methods as described herein provide a more precise and accurate object locating system that does not require extensive user intervention and manual input.

The illustrated example embodiments will be best understood by reference to the figures. The following description is intended only by way of example, and simply illustrates certain example embodiments.

FIG. 1 illustrates a method for determining the location of an object within an environment using a plurality of receivers. At 101 the system may receive a transmission signal from at least one transmitter. For ease of readability, the discussion will refer to a single object being tracked, and, therefore, a single transmission signal. However, it should be understood that multiple objects may be tracked, and, therefore, multiple signals may be received at substantially the same time at the same or a different subset of receivers. In the case that multiple signals are received at the same anchor, the system may offset receipt of the signals in time so that the signals are interleaved. This offset would be accounted for when determining the time of receipt as described in more detail below. The transmitter may be affixed to, co-located with, or otherwise coupled to an object. For example, an object may have a transmitter attached to packaging of the object. As another example, the object may be located on a tray where the tray has a transmitter integral to or affixed on the tray. For ease of readability, the term transmitter will be used herein to refer to the component coupled to the object. However, it should be understood that the component may be strictly a transmitter, meaning that it can only send signals, or it may be a transceiver, meaning it can not only send signals, but also receive signals. Transceivers may not only allow the transmitter to send signals, but may also allow the transmitter to receive signals from other transmitters or from a receiver.

Figure 2:
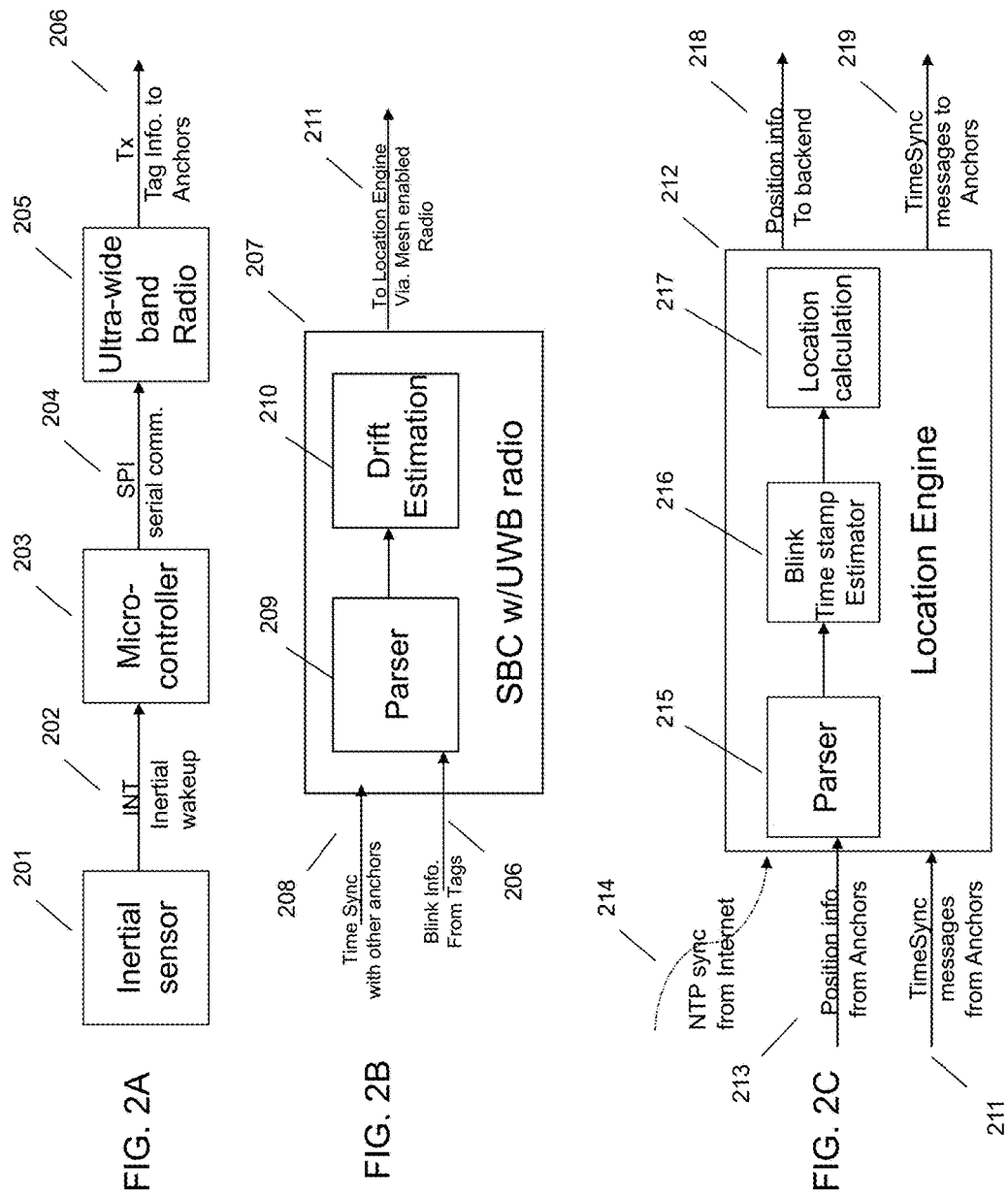
FIG. 2A illustrates an example block diagram of object tracking tags.
FIG. 2B illustrates an example block diagram of transceiver anchors.
FIG. 2C illustrates an example block diagram of a location engine.

The transmission signal may be provided when an action occurs with respect to the object, for example, the object moves, a process step is completed, or the like. Thus, the transmitter may include one or more sensors that can detect different attributes or characteristics of the transmitter and/or object. For example, FIG. 2A illustrates a block diagram of a transmission signal generation by a transmitter. An inertial sensor 201 coupled to the object or transmitter receives an indication that the object has moved or is moving, thereby generating a processor wake-up command 202 which is sent to a micro-controller or other processor 203 of the transmitter. The processor 203 then generates a transmission signal which is then communicated, for example, using a serial communication standard or other communication standard 204 to the ultra-wide band radio 205 of the transmitter. The transmission signal is then transmitted to receivers, also referred to as "anchors" of the system 206.

Each transmitter may be unique and may have a unique identification number or code. Thus, the transmission signal may include the transmitter identification number or other identifier so that the system can identify which transmitter has provided the transmission signal. The transmitter may also be associated with an object, for example, in a database, data storage system, or the like. Thus, the unique identification for the transmitter may also be associated with a specific object. As an example, the transmitter may have an identification code of 5349. However, this code may not have meaning to an operator or other user who is attempting to track the object. Thus, the operator may associate the transmitter code with a "name" or other object identifier so that when the operator is attempting to identify information associated with the object, the operator can provide the "name" or object identifier, rather than the transmitter identification.

The transmission signal may also contain other information. For example, depending on the application, the transmitter may include other sensors, for example, environmental sensors (e.g., radiation sensors, barometric sensors, pressure sensors, vibration sensors, etc.), biometric sensors (e.g., fingerprint sensors, retina sensors, voice capture devices, image capture devices, etc.), accelerometers, and/or the like. These sensors may detect different attributes or characteristics of the surrounding environment or the context of the transmitter or object. For example, the transmitter may include a humidity sensor that allows the transmitter to determine the humidity of the surrounding environment. As another example, the transmitter may include biometric sensors that can capture biometric information regarding an individual who is performing a process step with regard to the object. The information captured by the sensors may then be transmitted with or in the transmission signal for use by the system, as explained in more detail below.

The transmission signal may be received at a subset of a plurality of receivers. While the transmitters either do not require a power source, for example, as passive transmitters that receive power from a received signal, or are battery powered, the receivers may be powered. The power of the receiver may be through a wall power outlet, power-over-Ethernet connection, battery power, or the like. The system may include a plurality of receivers that are deployed within an environment. For example, the system may include ten receivers that are each located at a different location within an environment or facility. The plurality of receivers are connected together within a local network, referred to as a receiver network. Each receiver does not necessarily communicate with each other receiver, however, each receiver does communicate with at least one other receiver. Thus, the receiver may be a transceiver that not only receives signals from transmitters and other receivers, but is also able to send signals. In practice, the receiver or anchor may include two separate components for communication signals. One component may be a receiver or transceiver that collects and transmits transmission signals, whereas the other component may be the component required for creation of the receiver network. In other words, the second component may be a communication network chip that allows networking of the receivers together without interfering with the object transmission signals.

Each of the networked receivers does not require a connection to communication network, and, in practice, none of the networked receivers may be connected to a communication network other than the receiver network. In other words, each of the networked receivers do not require a wireless access point, satellite network access point, cellular network access point or the like. However, the receivers may include chips or cards that do allow connection to one or more of these communication systems. Thus, the systems and methods as described herein provide a network of receivers that can be deployed in any environment regardless of network access capabilities and/or positioning system capabilities. In other words, the described systems and methods can be deployed in locations that may or may not have or allow communication system access and in locations where other positioning systems cannot penetrate, do not work, or are specifically blocked.

The position of the anchors within the environment is known. The anchors may also know their position within the environment, however, this is not a strict requirement. To determine the position of the anchors, a calibration step may occur. During this calibration, the anchors communicate with each other to determine the relative location of the anchor with respect to the other anchors, for example, using a time of flight (TOF) calculation, time difference of arrival (TDOA) calculation, or other position optimization algorithm. This determination is similar to the determination that is used to identify the relative position of the object with respect to the anchors, and will, therefore, be discussed in more detail below, specifically, in conjunction with step 103. Once the relative position of the anchors with respect to each other have been determined, the system can correlate these relative positions with a map of the environment. This correlation is similar to the correlation that is used to determine the location of the object within the environment, and will, therefore, be discussed in more detail below, specifically, in conjunction with step 104.

The transmission signal may be received by a subset of the anchors. The subset may include the anchors that are closest to the transmitter or those within range of the transmitter. For example, the transmission signal may only be able to reach a certain distance, therefore, the anchors that receive the transmission signal may be those within that range. A subset may include all the anchors that are within the receiver network. However, in the system not all anchors must receive the signal. Rather, to obtain a two-dimensional position at least three of the anchors need to receive the transmission signal. To obtain a three-dimensional position at least four anchors need to receive the transmission signal.

The anchors that are connected together within the receiver network have a synchronized clock, meaning that the clocks associated with each receiver matches the clock associated with each other receiver and the receiver network "master" clock, if there is one. Thus, when the transmission signals are received at the receivers, the system identifies a time of receipt of the transmission signal at each of the receivers at 102. For example, the receivers or anchors may mark the transmission signal with a timestamp corresponding to the time of receipt of the signal at the receiver. Since all of the receivers have a synchronized clock, the times of receipt can be compared across the receivers without worrying about the times being inaccurate when compared to other times of receipt.

For example, FIG. 2B illustrates a block diagram of the receivers or anchors 207. The anchor 207 may be a single-board computer or other processor with a ultra-wide band radio. Each anchors receives a single that time syncs the anchors with the other anchors 208. When the receiver receives the transmission signal or blink information from the transmission tags 206, the signal is processed by the anchor 207. This processing may include parsing the signal using a parser 209. This allows the anchor to differentiate different information that may be included in the transmission signal, for example, the transmitter identification code, sensor information, or the like. The anchor 207 may also use perform a drift estimation 210 that accounts for any differences in the clocks. In other words, if the system determines that one clock is different from another clock based upon the synchronization, the system may correct the time of receipt for that signal based upon the drift estimation. As an example, if the system polls the system clock and determines that the anchor clock is inaccurate by half a second, the anchor may compensate for this drift and mark the signal with the corrected timestamp. The transmission signal, or transmission signal components with the marked timestamp to the location engine via a mesh enabled radio 211.

The system may include a location engine that can determine the position of an object within an environment. The location engine may be located within the facility or may be located in an outside location (e.g., cloud data storage location, other network storage location, remote data storage location, etc.). The location engine uses all the timestamped transmission signals to determine the position of the object within the environment. To transmit the transmission signals to the location engine, the anchors may use a mesh network. A mesh network is a network where signals are transmitted from a starting node to an end node in the network using a route through other nodes of the network. In this case, the nodes of the mesh network are the anchors. Thus, the starting node is one of the anchors (e.g., the anchor that received the transmission signal) and the end node is the location engine which is a central location. To get from the starting node, the system transmits the signal from one anchor to another anchor and so on until the end node is reached.

Depending on the route chosen the transmission signal may be quickly transmitted to the location engine or may take longer to be transmitted to the location engine. Thus, the system may include an optimization algorithm that attempts to determine the best route through the mesh network for transmission of a signal from a starting location to an ending location. The optimization algorithm attempts to find the quickest or most reliable route. However, finding a route requires processing time and resources. Thus, the optimization algorithm must balance finding a route with reducing the processing time and resources needed to find the route. In other words, if the optimization algorithm calculates the best route every time a signal is received, it may take a significant amount of time for the transmission signal to actually be transmitted from the starting node to the end node. On the other hand, if the system always uses the same route, the route may be inefficient which results in a long time for a signal to be transmitted from the starting node to the end node. Thus, the optimization algorithm attempts to balance these requirements. Additionally, the mesh network can repair itself if nodes fall off the network or transmission of signals fail.

At 103 the system may determine whether the relative position of the object with respect to the anchors can be determined. In order to determine the relative position of the object with respect to the anchors, the location engine, or other central location, may use one or more location optimization algorithms. Different location optimization algorithms have different advantages. For example, a time of flight calculates positions at the intersection of several circles. However, such a calculation requires more messages to be exchanges between tags and anchors, which consumes more battery. A time difference of arrival calculates positions at the intersection of several hyperbola. However, this type of calculation requires less messages to be exchanged between tags and anchors, which consumes less battery.

Since all the transmission signals include a marked timestamp that are all synchronized, the location engine can use the timestamped transmission signals to determine how far the transmitter is from the receiving anchor. Using the timestamped transmission signals, the system may use a location optimization algorithm (e.g., time of flight calculation, time difference of arrival calculation, etc.) to determine an area around an anchor that the transmitter could be located. In other words, if the system determines that a signal took a specific length of time to reach an anchor, the system can essentially draw an area around the anchor that corresponds to that length of time. Doing this for all of the receiving anchors, the system identifies a plurality of areas that are around a plurality of anchors. The system can then determine the location of overlap, thus corresponding to the location of the transmitter with respect the receiving anchors. In other words, the system can use a trilateration calculation that uses distances and intersections of circles or areas to calculate the relative position of the transmitter with respect to the anchors. Another calculation that may be used to determine the relative position of the transmitter is triangulation, where angles are used to determine the location of the transmitter. Another example calculation that may be employed is multilateration where hyperbolas are solved for time, for example, using the TDOA calculation. These calculation methods result in a relative position that has an accuracy of a few centimeters or inches, thereby resulting in a system that is much more accurate than traditional object tracking systems.

For example, FIG. 2C illustrates a block diagram of a location engine 212 and communication to and from the location engine 212. The location engine 212 receives the timestamped messages from the anchors 211. The location engine 212 also receives position information from the anchors 213 that identifies the position of the anchor within the environment or with respect to each other. The location engine 212, since it is connected to an outside network, can receive time sync information from the outside network 214. The location engine 212 can then process the timestamped messages to determine the relative position of the transmitter with respect to the anchors. For example, the location engine 212 may use a parser 215 performing a function similar to the parser of the anchors 209. The location engine 212 may also include a blink time stamp estimator 216 that identifies the time of receipt of the transmission signal to each of the anchors and makes sure that they are synchronized. Using these timestamped and synchronized signals the location engine 212 can perform the location calculation 217 as described above. The position information can then be passed to the backend system 218. The location engine 212 is also the component that passes the time sync information to the anchors 219 that ensures that the anchors are time synced.

If the system cannot determine a relative position of the object at 103, the system may ignore the transmission signal at 105. Alternatively, the system may attempt to obtain additional information in order to determine the relative position of the object. If, however, the system can determine a relative position of the object at 103, the relative position may be used to identify a location of the object within the environment at 104. The location engine may be the only node within the network that is connected to an outside network. For example, the location engine may be connected to a wireless access point, a wired access point, or the like. Thus, from the location engine the information from the location engine can be transmitted to a location outside the facility. Accordingly, the location engine can provide the determined relative position of the object to a backend engine that can then determine the location of the object within the environment.

The backend engine may also provide a graphical user interface that can be accessed by a user. The graphical user interface may display a map of the environment and a location of the object within the environment. To determine the location of the object within the environment, the system correlates the relative position of the object with respect to the anchors to a map of the environment. The map of the environment may include a facility blueprint or map. The system then creates a coordinate system for the map. Based upon the positions of the anchors within the facility the system can create a virtual map reflecting the position of the anchors and the position of the transmitter with respect to the anchors. As discussed above, the anchors may determine a relative position of themselves with respect to each other using one of the location optimization algorithms. Additionally or alternatively, the position of the anchors may be determined manually and these manual measurements or positions may be provided to the system. The system may apply the same coordinate system to the virtual map and then overlay the virtual map to the environment map using the coordinate system. Thus, the location of the object within the environment may be displayed on the graphical user interface.

Figure 3:
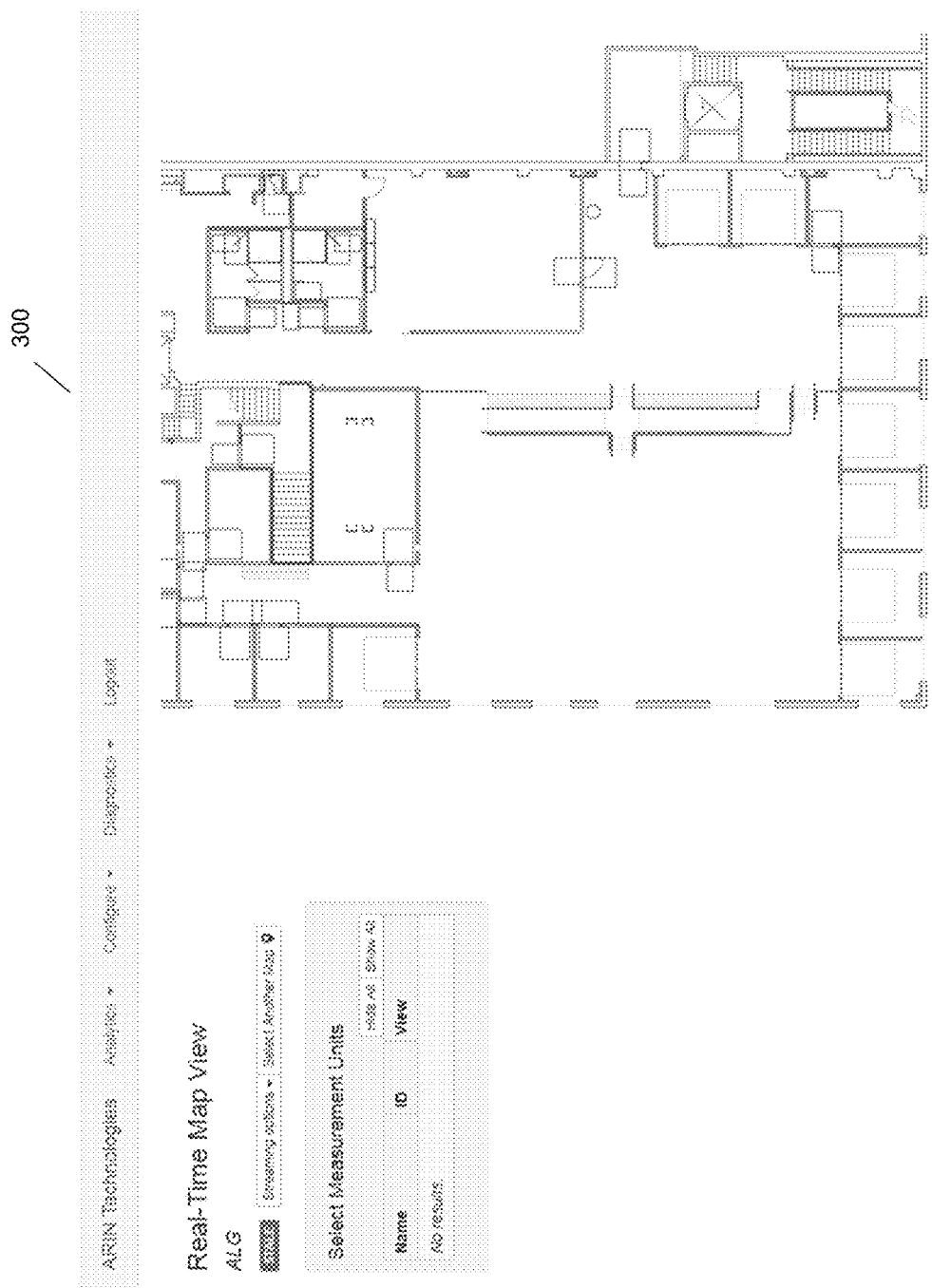
FIG. 3 illustrates an example graphical user interface for object tracking.
Figure 4:
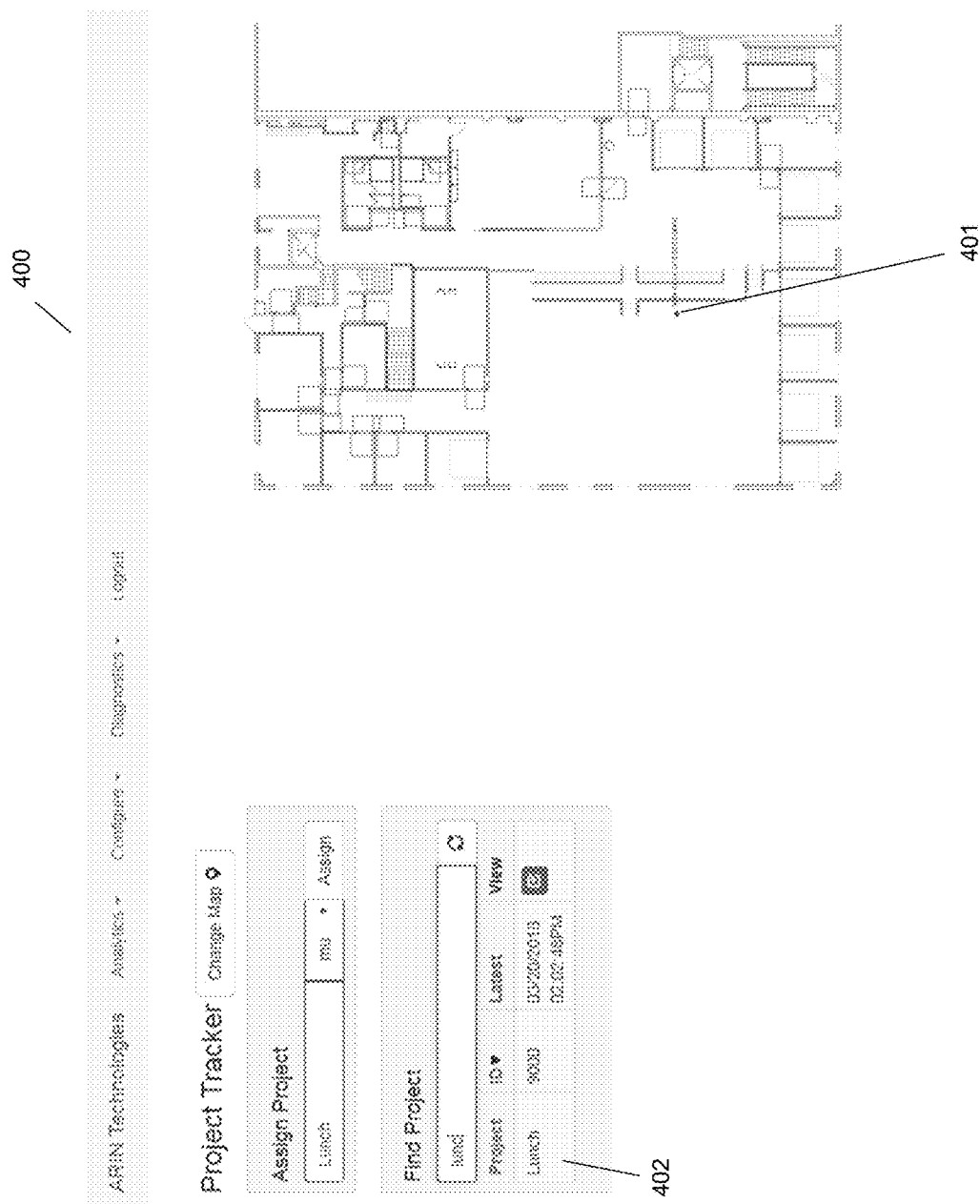
FIG. 4 illustrates an example graphical user interface for object tracking including a tracked object.
Figure 5:
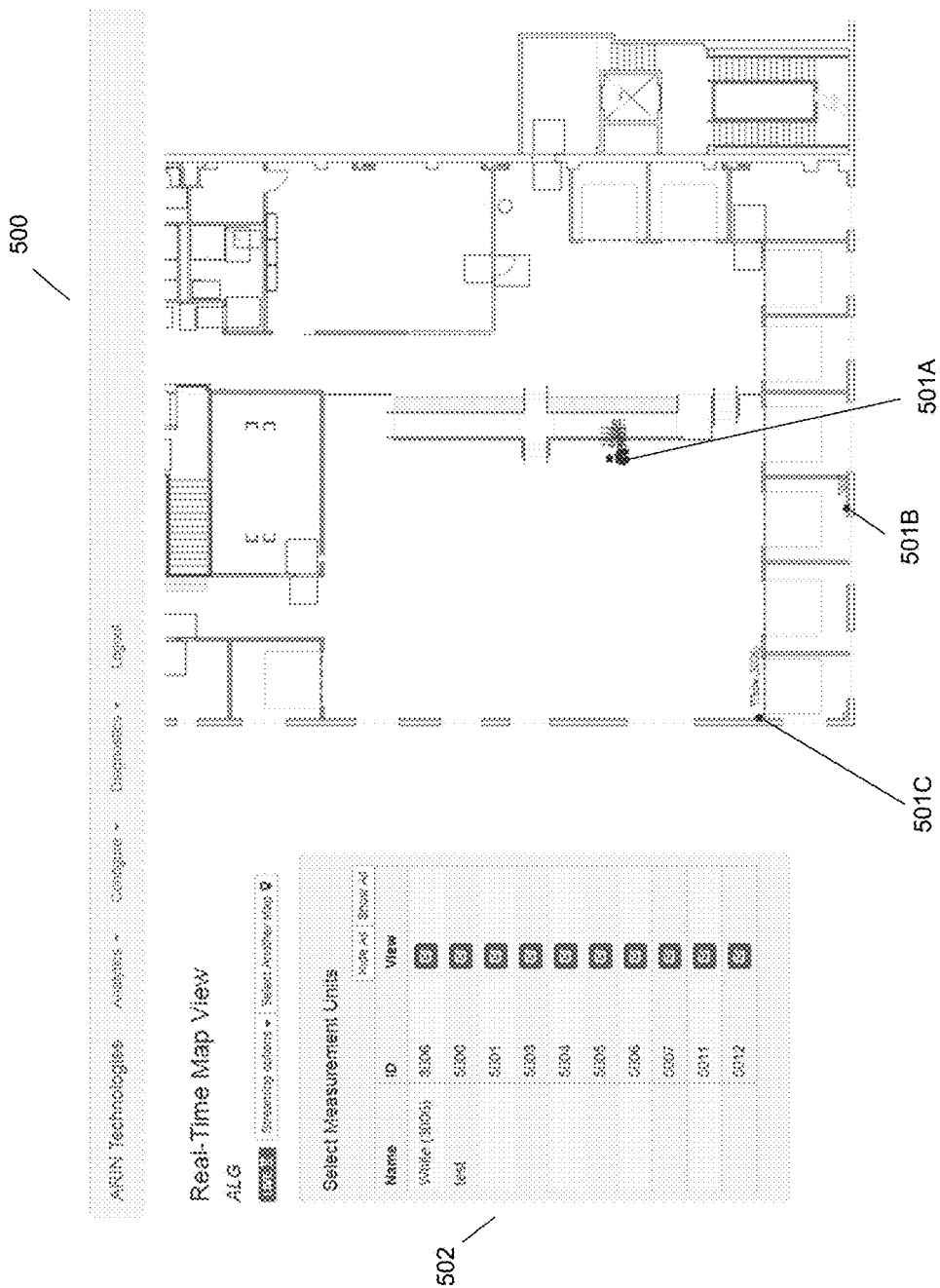
FIG. 5 illustrates an example graphical user interface for object tracking including multiple tracked objects.

For example, FIG. 3 illustrates an example environmental map 300 which shows the location of walls and other objects within the environment. FIG. 4 illustrates an example graphical user interface having object locations. The user can provide input at 402 to select an object for tracking or location identification. Based upon the input provided at 402 the system shows the location of the object within the environment, for example, using a dot and label as shown at 401. It should be understood that other displays may be used, for example, X's, no labels, arrows, colored indicators, or the like. FIG. 5 illustrates a graphical user interface 500 having more than one selected object for location identification 502 and therefore, more than one object location indicator 501A-501C.

Not only does the backend system provide the graphical user interface, but it also stores the object location information history. Thus, the system can be used to perform additional or alternative actions using the identified location. For example, a user can then identify historical positions of objects, for example, to determine if an object was at a location, or the like. The backend system may also provide an area where the end user can set up different rules for locations. For example, the end user may create an alert that corresponds to a specific location within a facility. This alert may provide a communication to the end user when an object enters or exits the location. As another example, the end user may create a rule corresponding to contextual information transmitted with the transmission signal. For example, if the contextual information indicates a dangerous, unsuitable, or abnormal environment, an alert may be transmitted. As another example, the end user may create a rule corresponding to a specific transmitter. For example, if the object is a high priority object, the end user may want communications indicating the location of the object within the facility. Other rules may be possible and are contemplated.

Figure 6:
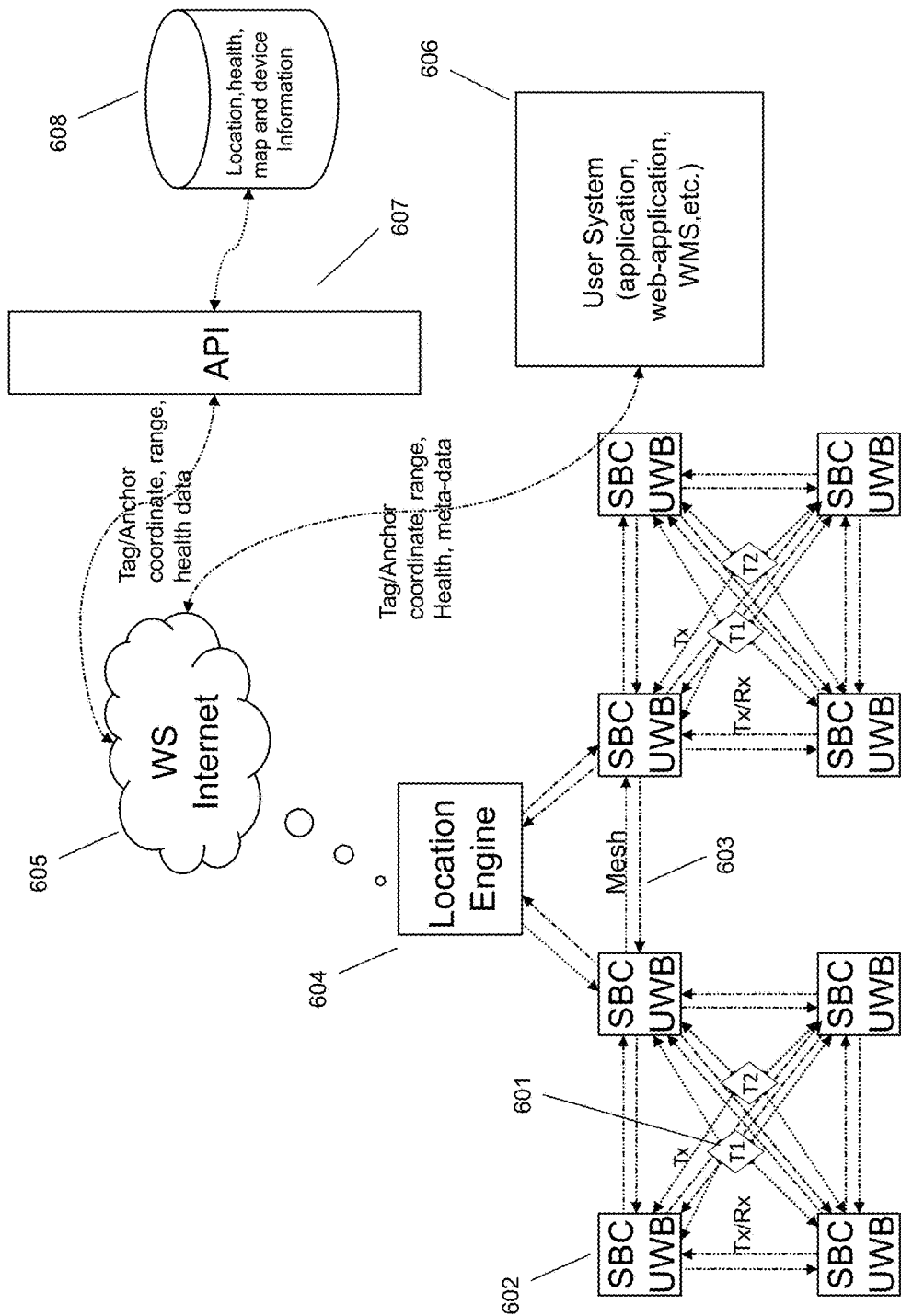
FIG. 6 illustrates an example system for object tracking using a location engine and mesh network.

FIG. 6 illustrates an example block diagram of the entire system. The transmitters, represented by 601, may transmit information to the anchors, represented by 602. The anchors 602 may communicate with each other over a mesh network 603. The anchors 602 may also communicate information over the mesh network 603 to a location engine 604, which may be connected to an external network, for example, a web services Internet connection 605. The location engine 604 determines the relative position of the transmitter 601 with respect to the receiving anchors 602. The location engine 604 then transmits this information to the back end user system 606 that displays the location of the object within the environment. The information may also be transmitted to an application programming interface (API) 607 which then stores the information in a data storage location 608.

Figure 7:
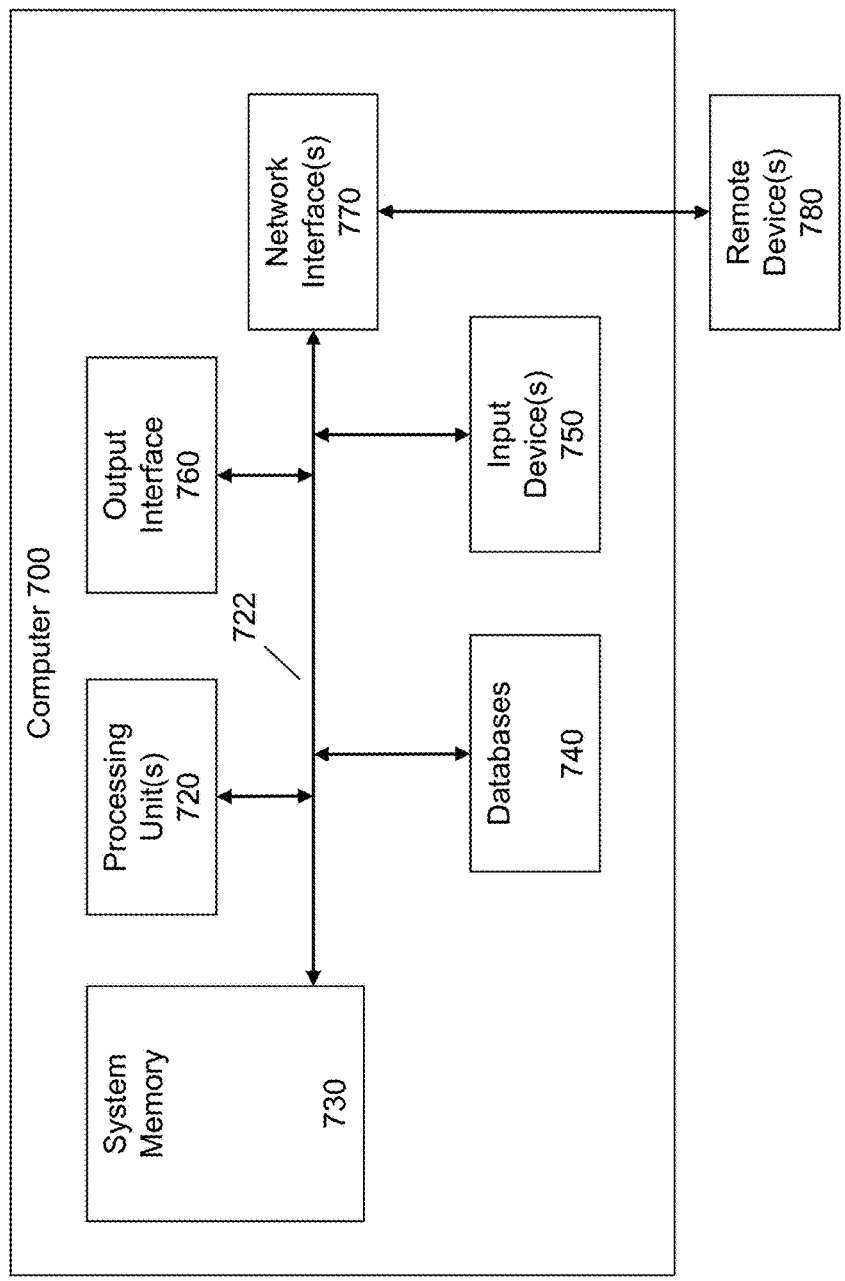
FIG. 7 illustrates an example of device circuitry.

While various other circuits, circuitry or components may be utilized in information handling devices, with a computer, server, client device or the like, an example device that may be used in implementing one or more embodiments includes a computing device in the form of a computer 700 as illustrated in FIG. 7. This example device may be a server used in one of the systems in a network, or one of the remote computers connected to the network. Components of computer 700 may include, but are not limited to, a processing unit 720, a system memory 730, and a system bus 722 that couples various system components including the system memory 730 to the processing unit 720. Computer 700 may include or have access to a variety of computer readable media, including databases. The system memory 730 may include non-signal computer readable storage media, for example in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 700 through input devices 780. A monitor or other type of device can also be connected to the system bus 722 via an interface, such as an output interface 760. The computer may include a database 740. In addition to a monitor, computers may also include other peripheral output devices. The computer 700 may operate in a networked or distributed environment using logical connections to one or more other remote device(s) 780 such as other computers. The logical connections may include network interface(s) 770 to a network, such as a local area network (LAN), a wide area network (WAN), and/or a global computer network, but may also include other networks/buses.

Information handling device circuitry, as for example outlined in FIG. 7, may be used in client devices such as a personal desktop computer, a laptop computer, or smaller devices such as a tablet or a smart phone. In the latter cases, i.e., for a tablet computer and a smart phone, the circuitry outlined in FIG. 7 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 7 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
receiving, from at least one transmitter coupled to an object, a transmission signal, wherein the transmission signal is received at a subset of a plurality of receivers, wherein the plurality of receivers are connected together through a network and have a synchronized clock;
identifying, for each of the plurality of receivers in the subset, a time of receipt of the transmission signal and marking the transmission signal with a timestamp corresponding to the time of receipt;
determining, using the marked transmission signals, a relative position of the object relative to the receivers; and
identifying a location of the object within an environment by correlating the determined relative position of the object to a map of the environment.

2. The method of claim 1, further comprising determining a location of the plurality of receivers within the environment by determining a relative position of each of the plurality of receivers with respect to at least one other of the plurality of receivers and correlating the position to a map of the environment.

3. The method of claim 1, wherein the subset comprises at least three receivers and wherein the position information comprises a two-dimensional position.

4. The method of claim 1, wherein the subset comprises at least four receivers and wherein the position information comprises a three-dimensional position.

5. The method of claim 1, wherein the determining a relative position of the object comprises transmitting, using a mesh network, the marked transmission signal from each of the subset of receivers to central location for location processing.

6. The method of claim 5, wherein the transmitting using a mesh network comprises transmitting the marked transmission signal from a starting node of the mesh network to an end node of the mesh network using a selected route traversing other nodes of the mesh network.

7. The method of claim 1, wherein the determining a relative position comprises using a location optimization algorithm.

8. The method of claim 1, wherein the determining a relative position comprises using the marked transmission signals to calculate the position of the object with respect to the subset of the plurality of receivers.

9. The method of claim 1, wherein the transmission signal comprises contextual information.

10. The method of claim 1, further comprising performing an action based upon the location of the object within the environment.

11. A system, comprising:
a plurality of receivers connected together through a network and having a synchronized clock;
a processor;
a memory device that stores instructions executable by the processor to:
receive, from at least one transmitter coupled to an object, a transmission signal, wherein the transmission signal is received at a subset of the plurality of receivers;
identify, for each of the plurality of receivers in the subset, a time of receipt of the transmission signal and marking the transmission signal with a timestamp corresponding to the time of receipt;
determine, using the marked transmission signals, a relative position of the object relative to the receivers; and
identify a location of the object within an environment by correlating the determined relative position of the object to a map of the environment.

12. The system of claim 11, further comprising determining a location of the plurality of receivers within the environment by determining a relative position of each of the plurality of receivers with respect to at least one other of the plurality of receivers and correlating the position to a map of the environment.

13. The system of claim 11, wherein the subset comprises at least three receivers and wherein the position information comprises a two-dimensional position.

14. The system of claim 11, wherein the subset comprises at least four receivers and wherein the position information comprises a three-dimensional position.

15. The system of claim 11, wherein to determine a relative position of the object comprises transmitting, using a mesh network, the marked transmission signal from each of the subset of receivers to central location for location processing.

16. The system of claim 15, wherein to transmit using a mesh network comprises transmitting the marked transmission signal from a starting node of the mesh network to an end node of the mesh network using a selected route traversing other nodes of the mesh network.

17. The system of claim 11, wherein to determine a relative position comprises using a location optimization algorithm.

18. The system of claim 11, wherein to determining a relative position comprises using the marked transmission signals to calculate the position of the object with respect to the subset of the plurality of receivers.

19. The system of claim 11, wherein the transmission signal comprises contextual information.

20. A product, comprising:
a storage device that stores code, the code being executable by a processor and comprising:
code that receives, from at least one transmitter coupled to an object, a transmission signal, wherein the transmission signal is received at a subset of a plurality of receivers, wherein the plurality of receivers are connected together through a network and have a synchronized clock;
code that identifies, for each of the plurality of receivers in the subset, a time of receipt of the transmission signal and marking the transmission signal with a timestamp corresponding to the time of receipt;
code that determines, using the marked transmission signals, a relative position of the object relative to the receivers; and
code that identifies a location of the object within an environment by correlating the determined relative position of the object to a map of the environment.

* * * * *